United States Patent [19]
Pereira, Jr.

[11] 4,205,364
[45] May 27, 1980

[54] MICROCAPACITORS HAVING BEVELED EDGES AND CORNERS

[75] Inventor: Robert J. Pereira, Jr., Plainview, N.Y.

[73] Assignee: Phase Industries, Inc., Huntington Station, N.Y.

[21] Appl. No.: 953,748

[22] Filed: Oct. 23, 1978

[51] Int. Cl.² .............................................. H01G 4/00
[52] U.S. Cl. .................... 361/274; 361/272; 361/303; 361/311; 361/321
[58] Field of Search ............... 361/272, 274, 275, 321, 361/303

[56] References Cited
U.S. PATENT DOCUMENTS

| 2,065,921 | 12/1936 | Gerth et al. | 361/321 |
| 2,566,666 | 9/1951 | Khouri | 361/321 X |
| 3,603,850 | 9/1971 | Kirschner | 361/321 X |

Primary Examiner—E. A. Goldberg
Attorney, Agent, or Firm—Edward H. Loveman

[57] ABSTRACT

An improved capacitor assembly has a rectangular top and bottom electrodes secured to a ceramic block having flat top and bottom faces. Opposite end and side edges of the block and electrodes are beveled and curved and corners of the assembly are rounded. This provides a rugged and more reliable capacitor structure in which abrupt metal-to-ceramic surfaces are eliminated. Any tendency of electrodes to separate from the ceramic block due to mechanical or thermal shocks are minimized. The capacitor may be embodied in a hybrid electronic circuit, a microstrip conductor-capacitor assembly, or the like.

5 Claims, 4 Drawing Figures

MICROCAPACITORS HAVING BEVELED EDGES AND CORNERS

BACKGROUND OF INVENTION

This invention relates to microcapacitors and more particularly concerns an improved capacitor construction and method of making the same.

Herefore conventional microcapacitors have been made of six-sided ceramic dielectric wafers or blocks all of whose faces and sides are rectangular or square. Opposite broad sides of the dielectric blocks carry thin metal electrodes. The capacitor blocks have sharp angular corners and edges. It has been found in practice that such capacitors are subject to failure or unreliability in operation due to several causes. The abrupt metal to ceramic interfaces tend to develop crack-propagation flaws. There is a tendency for separation of the electrodes from the ceramic blocks or wafers when the capacitors are subject to thermal or mechanical shock. The machining or grinding of edges of capacitors develops partially detached conductive metallic particles which tend to break loose when the capacitors are in use, causing static discharges, arcing, shorting, and electrical failure.

SUMMARY OF INVENTION

The present invention is directed at providing microcapacitors in which the above and other difficulties and disadvantages are overcome. The new microcapacitors have optimized strength and electrical performance. According to the invention, there are provided microcapacitors which are substantially rectangular on opposite broad faces where electrodes are coated. All edges of the capacitors are beveled and slightly rounded. All corners are rounded. Lower sides of the capacitors are larger in area than the upper sides, so that the capacitors have a generally truncated pyramidal shape. In edgewise elevational view, the narrow edges of the capacitors are trapezoidal, with opposite slightly convex edges. This rounding of the edges contributes to the ruggedness of the structure.

The microcapacitors are diced and in the process are micropolished to insure clean, smooth sides and edges completely free of ceramic particles and conductive metal particles. The polished surfaces are as fine as that of the sintered ceramic of which the dielectric blocks are made. The ceramic has extremely fine grain. The finished microcapacitor is an intrinsically more reliable capacitor than that obtained in thick or thin film capacitors currently known.

These and other objects and many of the attendant advantages of this invention will be readily appreciated as the same becomes better understood by reference to the following detailed description when considered in connection with the accompanying drawings in which.

DETAILED DESCRIPTION OF THE PREFERRED EMBODIMENTS

Figure 1:
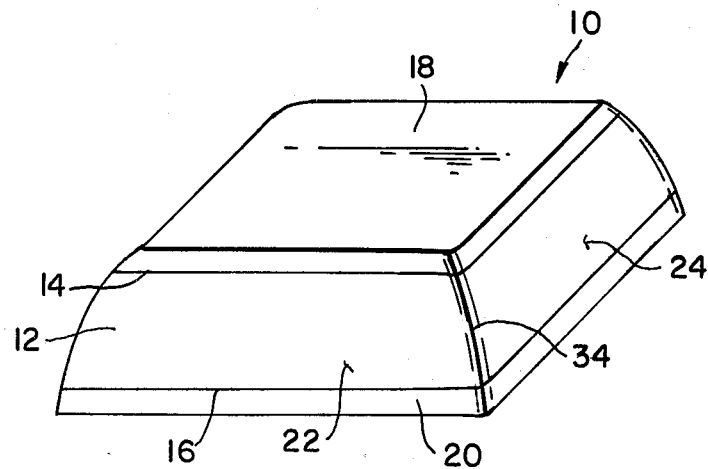
FIG. 1 is a perspective view of a microcapacitor embodying the invention.
Figure 2:
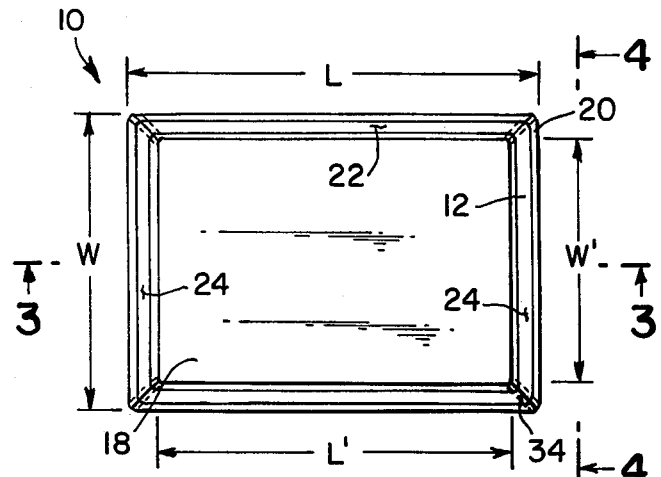
FIG. 2 is a top plan view of a microcapacitor.
Figure 3:
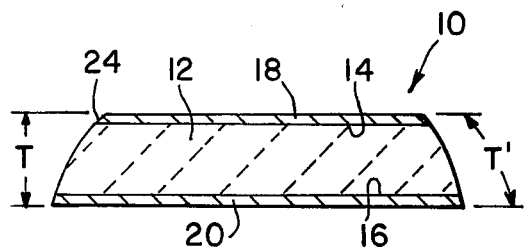
FIG. 3 is a cross sectional view taken along line 3—3 of FIG. 2.
Figure 4:
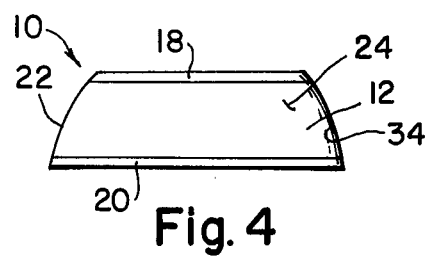
FIG. 4 is an end edgewise elevational view taken along line 4—4 of FIG. 2.

Referring now to the drawings wherein like reference characters designate like or corresponding parts throughout, there is illustrated in FIGS. 1-4, a microcapacitor generally designated as reference numeral 10 which has a generally rectangular ceramic body 12 with flat top and bottom sides 14, 16. The top and bottom sides 14, 16 are coated with respective electrodes 18, 20 which are generally rectangular in plan view. The lower electrode 20 is longer in length L and width W than the corresponding length L' and width W' of the upper electrode 18. The electrodes 18, 20 are secured completely to the adjacent surfaces of dielectric body 12 which is made of nonporous, ceramic. The dielectric body 12 is completely free of inclusions, chips, and cracks, and the electrodes 18, 20 are likewise completely free of cracks, and metal particles.

Lateral edges 22 and 24 of the capacitor 10 have beveled, curved sides inclined inwardly from the bottom to the top of the capacitor 10. This optimum form of the capacitor 10 has rounded corners 34, and rounded edges 22, 24. Such a structure is far more rugged and stable mechanically than those prior microcapacitors made with sharp corners and flat edges. The rounded corners and edges are obtained by micropolishing the edges of the capacitor with streams of abrasive grains as they are diced.

It will be noted that the actual width T' of the capacitor edges is greater than the thickness T of the capacitor 10. This structure provides a longer arc-over path than that of conventional capacitors having flat edges perpendicular to top and bottom surfaces of the capacitor. The beveled and rounded edges and corners minimize the potential for crack-propagation flaws, and eliminate abrupt metal-to ceramic interfaces, thereby reducing the tendency for separation when subject to thermal or mechanical shocks.

In a typical mechanical configuration, the lower length L or width W of the capacitor can range from 0.018 to 0.090 inches or 0.459 to 2.29 millimeters. The smaller upper length L' or width W' can range from 0.014 to 0.068 inches or 0.357 to 1.171 millimeters. Capacitance can range from 0.1 to greater than 1000 pF with the microcapacitors also useful at very high frequencies ranging up to 50 GHz. Due to its rugged construction it meets or exceeds requirements of military specifications and has an operating temperature range exceeding 55° C. to 125° C.

The electrodes can be thick films of gold or platinum-gold, or thin films of gold over chromium or gold over nickel. The dielectric is a sintered ceramic virtually unaffected by moisture and commonly used cleaning solvents. It is impervious to static discharge failures, and can withstand considerable overvoltage without damage.

In fabricating the microcapacitors each side of a large sintered ceramic plate is conventionally coated or bonded with a metallic film to form the electrodes 18, 20. The ceramic plate is then secured to a glass slide by means of an acetone soluble heat sensitive adhesive and the glass slide is placed on a conventional x-y table i.e., a table moveable in a single plane in two perpendicular directions. The ceramic plate is then cut into individual capacitors by moving the glass slide carrying the ceramic plate in a longitudinal and transverse grid under a nozzle through which a stream of air and abrasive such as aluminum oxide, is discharged at a high velocity. The stream of air and abrasive separates the individual capacitors, from the ceramic plate, with beveled edges which are simultaneously micropolished by the stream.

The slide is placed in acetone and the individual capacitors are removed, then visually inspected and tested electrically. The resultant capacitors have the polished and beveled edges, and the rounded corners illustrated in FIGS. 1-4. The coated film may comprise platinum gold, pure gold, platinum silver, or fine silver, and may be silk screened to the sintered plate in a conventional manner. If desired thin films of pure metals may be coated on the sintered plate i.e., by sputtering for example, a thin layer of chromium or nickel onto the sintered ceramic plate, then sputtering a thin layer of gold and then plating gold thereon in a conventional manner. If desired the electrodes, may be comprised of thin electrically conductive plates which are bonded to the ceramic plate by any of several well known and conventional adhesives.

It should be understood that the foregoing relates to only a limited number of preferred embodiments of the invention which have been by way of example only and that it is intended to cover all changes and modifications of the examples of the invention herein chosen for the purposes of the disclosure, which do not constitute departures from the spirit and scope of the invention.

The invention claimed is:

1. A microcapacitor assembly, comprising:
   a dielectric body having upper and lower flat rectangular face parallel to each other, said upper face being smaller in area than said lower face;
   a first metal electrode on said upper face completely covering the same; and
   a second metal electrode on said lower face completely cover the same, lateral edges of said first and second electrode registering with corresponding edges of said dielectric body, lateral edges and corners of said dielectric body and adjacent edges and corners of said electrodes being beveled to eliminate abrupt metal to dielectric interfaces, and to reduce any tendency for separation of electrodes from said dielectric body when subject to thermal and mechanical shocks.

2. A microcapacitor assembly as defined in claim 1, wherein said lateral edges of said dielectric body and said electrodes are curved so that the surface width of said assembly is greater than the thickness of said assembly to provide an arc-over path which is greater than the thickness of said assembly.

3. A microcapacitor assembly as defined in claim 2, wherein said lateral edges of said dielectric body and said electrodes are convex and inclined inwardly from bottom to top of said assembly, to maximize stability of structure of said assembly.

4. A microcapacitor assembly as defined in claim 3, wherein said assembly is micropolished to insure clean smooth sides completely free of metal particles.

5. A microcapacitor assembly as defined in claim 4, wherein said electrodes and said dielectric body have such sizes that said assembly has a predetermined capacitance ranging from 0.1 pF to greater than 1000 pF, and is operable at a frequency up to 50 GHz.

* * * * *